(12) United States Patent
Takeda et al.

(10) Patent No.: US 11,496,344 B2
(45) Date of Patent: Nov. 8, 2022

(54) TERMINAL, RADIO COMMUNICATION METHOD, BASE STATION, AND SYSTEM TO COMMUNICATE USING HYBRID AUTOMATIC REPEAT REQUEST ACKNOWLEDGEMENT

(71) Applicant: NTT DOCOMO, INC., Tokyo (JP)

(72) Inventors: Kazuki Takeda, Tokyo (JP); Satoshi Nagata, Tokyo (JP); Shaozhen Guo, Beijing (CN); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 16 days.

(21) Appl. No.: 17/054,062

(22) PCT Filed: May 11, 2018

(86) PCT No.: PCT/JP2018/018408
§ 371 (c)(1),
(2) Date: Nov. 9, 2020

(87) PCT Pub. No.: WO2019/215928
PCT Pub. Date: Nov. 14, 2019

(65) Prior Publication Data
US 2021/0281458 A1 Sep. 9, 2021

(51) Int. Cl.
*H04L 27/26* (2006.01)
*H04L 1/18* (2006.01)
*H04W 72/12* (2009.01)

(52) U.S. Cl.
CPC ...... *H04L 27/26025* (2021.01); *H04L 1/1819* (2013.01); *H04L 1/1896* (2013.01); *H04W 72/1268* (2013.01)

(58) Field of Classification Search
CPC ............. H04L 27/26025; H04L 1/1819; H04L 1/1896; H04W 72/1268
See application file for complete search history.

(56) References Cited

U.S. PATENT DOCUMENTS

| 2013/0286993 A1* | 10/2013 | Lee | H04L 5/0053 370/329 |
| 2013/0322357 A1* | 12/2013 | He | H04W 28/12 370/329 |

(Continued)

FOREIGN PATENT DOCUMENTS

WO    2018/175820 A1    9/2018

OTHER PUBLICATIONS

International Search Report issued in PCT/JP2018/018408 dated Jul. 31, 2018 (1 page).

(Continued)

*Primary Examiner* — Jael M Ulysse
(74) *Attorney, Agent, or Firm* — Osha Bergman Watanabe & Burton LLP

(57) ABSTRACT

A user terminal according to one aspect of the present disclosure includes: a transmitting/receiving section that performs transmission and reception by using a first Component Carrier (CC) that uses a first Sub-Carrier Spacing (SCS), and a second CC that uses a second SCS larger than the first SCS; and a control section that, when a semi-static Hybrid Automatic Repeat reQuest Acknowledgement (HARQ-ACK) codebook related to both of the first CC and the second CC is transmitted on an uplink shared channel of the second CC, deletes an HARQ-ACK bit corresponding to a downlink shared channel candidate that does not satisfy a requirement of processing time. According to one aspect of the present disclosure, it is possible to appropriately transmit HARQ-ACK even when a semi-static HARQ-ACK codebook is configured.

4 Claims, 11 Drawing Sheets

(56) References Cited

U.S. PATENT DOCUMENTS

| | | | | |
|---|---|---|---|---|
| 2013/0322358 | A1* | 12/2013 | He | H04L 1/1861 370/329 |
| 2014/0078944 | A1* | 3/2014 | Yang | H04L 5/14 370/280 |
| 2014/0376421 | A1* | 12/2014 | Yang | H04L 1/1819 370/280 |
| 2015/0131494 | A1* | 5/2015 | He | H04W 72/0413 370/280 |
| 2015/0156764 | A1* | 6/2015 | Yang | H04L 5/001 370/329 |
| 2016/0192376 | A1* | 6/2016 | Lee | H04W 72/085 370/252 |
| 2016/0212734 | A1* | 7/2016 | He | H04L 5/14 |
| 2017/0164296 | A1* | 6/2017 | Nogami | H04W 52/34 |
| 2017/0164299 | A1* | 6/2017 | Shimezawa | H04W 52/34 |
| 2017/0215179 | A1* | 7/2017 | Choi | H04L 1/0025 |
| 2017/0310447 | A1* | 10/2017 | Kusashima | H04W 72/0406 |
| 2019/0103943 | A1* | 4/2019 | Wang | H04L 1/1854 |
| 2019/0254060 | A1* | 8/2019 | Li | H04L 5/0082 |
| 2019/0289598 | A1* | 9/2019 | Shimezawa | H04L 27/26025 |
| 2019/0357156 | A1* | 11/2019 | Lee | H04W 52/242 |
| 2020/0021976 | A1* | 1/2020 | Shimezawa | H04W 76/27 |
| 2020/0022175 | A1* | 1/2020 | Xiong | H04L 1/1861 |
| 2020/0235891 | A1* | 7/2020 | Lei | H04L 1/1864 |
| 2021/0204286 | A1* | 7/2021 | Yang | H04L 5/0055 |
| 2021/0219328 | A1* | 7/2021 | Xiong | H04L 1/1854 |

OTHER PUBLICATIONS

Written Opinion of the International Searching Authority issued in PCT/JP2018/018408 dated Jul. 31, 2018 (3 pages).

Intel Corporation; "HARQ-ACK multiplexing and bundling"; 3GPP TSG RAN WG1 NR Ad-Hoc#2, R1-1710572; Qingdao, P.R. China; Jun. 27-30, 2017 (6 pages).

LG Electronics, III; "WF on repetition for UL URLLC"; 3GPP TSG RAN1 #88-bis, R1-17xxxxx; Spokane, US; Apr. 3-7, 2017 (4 pages).

Qualcomm Incorporated; "Scaled Numerology for URLLC UL Channel Design"; 3GPP TSG-RAN WG1 #89, R1-1708630; Hangzhou, P.R. China; May 15-19, 2017 (7 pages).

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

Extended European Search Reported issued in Application No. 18917730.6 dated Nov. 16, 2021 (7 pages).

Qualcomm Incorporated "Summary of DL/UL scheduling and HARQ management" 3GPP TSG-RAN WG1 Meeting AH 1801, R1-1803388, Feb. 26-Mar. 2, 2018, Athens, Greece (22 pages).

Office Action issued in the counterpart Japanese Patent Application No. 2020-517747, dated Jun. 7, 2022 (6 pages).

CATT; "Discussion on HARQ management and HARQ-ACK feedback"; 3GPP TSG RAN WG1 #90-bis, R1-1717834; Prague, CZ; Oct. 9-13, 2017 (7 pages).

* cited by examiner

TERMINAL, RADIO COMMUNICATION METHOD, BASE STATION, AND SYSTEM TO COMMUNICATE USING HYBRID AUTOMATIC REPEAT REQUEST ACKNOWLEDGEMENT

TECHNICAL FIELD

The present disclosure relates to a user terminal and a radio base station of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger volume and higher sophistication of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) have been also studied.

In legacy LTE systems (e.g., LTE Rel. 8 to 13), a user terminal (UE: User Equipment) transmits Uplink Control Information (UCI) by using at least one of a UL data channel (e.g., a PUSCH: Physical Uplink Shared Channel) and a UL control channel (e.g., a PUCCH: Physical Uplink Control Channel).

The UCI may include, for example, retransmission control information (also referred to as Hybrid Automatic Repeat reQuest Acknowledgement (HARQ-ACK), ACK/NACK or A/N) for a downlink shared channel (PDSCH: Physical Downlink Shared Channel), a Scheduling Request (SR), and Channel State Information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

According to NR, it has been studied that the UE uses a semi-static HARQ-ACK codebook. However, according to the study that has been done so far, how semi-static HARQ-ACK to be transmitted on a PUSCH is configured when there is HARQ-ACK whose processing does not make it in time for transmission of a PUSCH is not clear. There is a risk that, if this point is not clarified, HARQ-ACK cannot be appropriately transmitted, and a communication throughput and frequency use efficiency deteriorate.

It is therefore one of objects of the present disclosure to provide a user terminal and a radio base station that can appropriately transmit HARQ-ACK even when a semi-static HARQ-ACK codebook is configured.

Solution to Problem

A user terminal according to one aspect of the present disclosure includes: a transmitting/receiving section that performs transmission and reception by using a first Component Carrier (CC) that uses a first Sub-Carrier Spacing (SCS), and a second CC that uses a second SCS larger than the first SCS; and a control section that, when a semi-static Hybrid Automatic Repeat reQuest Acknowledgement (HARQ-ACK) codebook related to both of the first CC and the second CC is transmitted on an uplink shared channel of the second CC, deletes an HARQ-ACK bit corresponding to a downlink shared channel candidate that does not satisfy a requirement of processing time.

Advantageous Effects of Invention

According to one aspect of the present disclosure, it is possible to appropriately transmit HARQ-ACK even when a semi-static HARQ-ACK codebook is configured.

DESCRIPTION OF EMBODIMENTS (PDSCH-to-ACK Timing)

Figure 1:
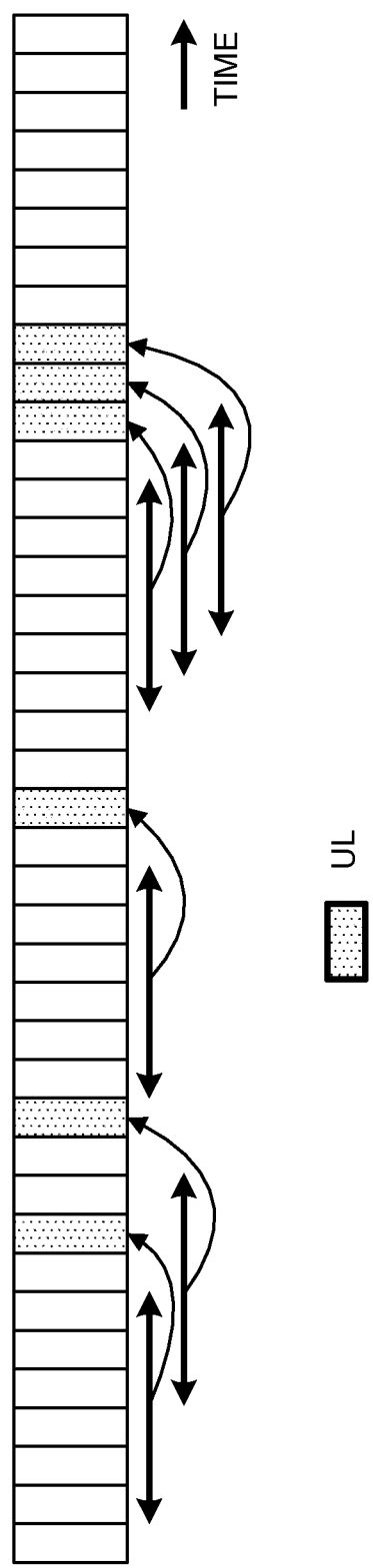
FIG. 1 is a conceptual explanatory diagram of an HARQ-ACK bundling window.

According to NR, a UE determines a timing (a PDSCH-to-ACK timing that may be referred to as "$K_1$") from reception of a PDSCH to transmission of HARQ-ACK corresponding to the PDSCH based on DCI (that may be referred to as DL DCI, a DL assignment, a DCI format 1_0 or a DCI format 1_1) for scheduling the PDSCH.

When, for example, detecting the DCI format 1_0, the UE transmits HARQ-ACK corresponding to a PDSCH in a slot n+k (k 1 to 8) whose reference is a slot n including a final symbol of the PDSCH based on "a PDSCH-to-HARQ-timing-indicator field" included in the DCI.

When detecting the DCI format 1_1, the UE transmits HARQ-ACK corresponding to the PDSCH in the slot n+k whose reference is the slot n including the final symbol of the PDSCH based on a "PDSCH-to-HARQ-timing-indicator field" included in the DCI. An association between k and the above timing-indicator-field described herein may be configured to the UE per PUCCH (or per PUCCH group or per cell group) by higher layer signaling.

In this regard, the higher layer signaling may be, for example, one of Radio Resource Control (RRC) signaling, Medium Access Control (MAC) signaling and broadcast information or a combination of these.

The MAC signaling may use, for example, an MAC Control Element (MAC CE) or an MAC Protocol Data Unit (PDU). The broadcast information may be, for example, a Master Information Block (MIB), a System Information Block (SIB), minimum system information (RMSI: Remaining Minimum system Information or Other System Information (OSI).

For example, the association may be configured by a parameter (that may be referred to as d1-DataToUL-ACK or Slot-timing-value-K1) included in a PUCCH configuration information element (PUCCH Config information element) of RRC signaling.

$K_1$ is configured per PUCCH group (or per cell group), and therefore even when CA (mixed numerology CA) (that may be referred to mixed numerology CA) including Component Carriers (CCs) to which different numerologies are configured (or used) in mixed manner is configured in the PUCCH group, a PDSCH-to-ACK timing that is common between CCs of different numerologies is configured.

In addition, $K_1$ may be a time decided based on a numerology (e.g., SCS) of a channel (e.g., a PUCCH or a PUSCH) for transmitting HARQ-ACK.

(UL Grant-to-PUSCH Timing)

Furthermore, according to NR, the UE determines a timing (that may be referred to as a UL grant-to-PUSCH timing, "$K_2$", or a difference between timings of a slot in which the PDCCH has been received and a slot in which the PUSCH is transmitted) from reception of DCI (UL DCI, a UL grant, a DCI format 0_0 or a DCI format 0_1) for scheduling the PUSCH to transmission of the PUSCH based on the DCI.

When, for example, detecting the DCI format 0_0 or 0_1, the UE determines a candidate (a parameter set such as $K_2$) of time domain Resource Allocation (RA) based on a "time domain resource assignment allocation" included in the DCI, and specifies time domain resource RA of a corresponding PUSCH based on the slot n in which the DCI has been detected.

An association (that may be referred to as a PUSCH time domain RA list) between a value (index) of the time domain RA field and a time domain RA candidate may be configured to the UE per cell (that may be referred to as a PUSCH-Cell) that transmits the PUSCH by higher layer signaling.

The PUSCH time domain RA list may correspond to a "pusch-AllocationList" Information Element (IE) of RRC signaling. It has been studied to include a given number (e.g., 16 at maximum) of PUSCH time domain RA candidates (that may be referred to as sequence elements or entries).

Each candidate corresponds to an IE ("PUSCH-TimeDomainResourceAllocation" IE) for configuring a relationship between time domains of the PDCCH and the PUSCH. The IE may include, for example, a parameter $K_2$, a mapping type indicating a mapping configuration of a DeModulation Reference Signal (DMRS), or a value (that may be referred to as a Start/Length Indication Value (SLIV)) indicating lengths of a PUSCH start symbol and a symbol unit.

$K_2$ is configured per UL cell, and therefore even when mixed numerology CA is configured, the same value may not be used between CCs of different numerologies.

In addition, $K_2$ may be a time decided based on a numerology (e.g., SCS) of the PUSCH.

(Processing Time)

Furthermore, according to NR, a PDSCH processing time and a PUSCH processing time have been studied. In this regard, the processing time may be read as a preparation time, a preparation procedure time or a processing procedure time.

The PDSCH processing time may be a duration to a UL symbol subsequent to an end of a final symbol of the PDSCH for transmitting a transport block. The UE may provide a valid HARQ-ACK in the same symbol as or in a subsequent symbol to the UL symbol.

The PUSCH processing time may be a duration to a UL symbol subsequent to an end of a final symbol of the PDCCH for transmitting DCI for scheduling the PUSCH. The UE may transmit the PUSCH in the same symbol as or in a subsequent symbol to the UL symbol.

The PDSCH processing time may be determined based on a parameter $N_1$ (that may be referred to as a PDSCH decoding time). The PUSCH processing time may be determined based on a parameter $N_2$ (that may be referred to as a PUSCH decoding time).

$N_1$ may be determined based on an SCS on downlink on which the PDSCH has been transmitted, and an SCS of a UL channel (e.g., the PUCCH or the PUSCH) on which the HARQ-ACK has been transmitted. For example, $N_1$ may be determined based on a minimum SCS of these SCSs, and may be decided as 8 to 20 symbols such as 8 symbols in a case where, for example, the minimum SCS is 15 kHz. $N_1$ may be decided as 13 to 24 symbols in a case where an additional PDSCH DMRS is configured.

$N_2$ may be determined based on an SCS on downlink on which the PDSCH for transmitting DCI for scheduling the PUSCH has been transmitted, and an SCS of a UL channel on which the PUSCH is transmitted. For example, $N_2$ may be determined based on a minimum SCS of these SCSs, and may be decided as 10 to 36 symbols such as 10 symbols in a case where, for example, the minimum SCS is 15 kHz.

That is, the processing time (and parameters (such as $N_1$ and $N_2$) related to the processing time) may conform to a value defined by numerologies associated with the minimum SCS among the PDCCH/PDSCH and the PUCCH/PUSCH. That is, even when mixed numerology CA is configured, a value that is common between CCs of different numerologies is defined for $N_1$ and $N_2$.

When HARQ-ACK corresponding to the PDSCH is transmitted by using the PUSCH, the PUSCH may be transmitted in a UL symbol subsequent to a time obtained by adding the processing time of the PDSCH and the processing time of the PUSCH (a sum of the times), or in a subsequent symbol.

(Semi-Static HARQ-ACK Codebook)

Furthermore, according to NR, it has been studied that the UE semi-statically or dynamically determines an HARQ-ACK codebook (that may be referred to as an HARQ-ACK size). The bae station may notify the UE of information (e.g., information indicating whether or not the HARQ-ACK codebook is semi-static or dynamic) indicating an HARQ-ACK codebook determination method by using higher layer signaling. The HARQ-ACK codebook may be referred to as an HARQ-ACK codebook of the PDSCH.

The UE may determine (generate) an HARQ-ACK information bit based on the determined HARQ-ACK codebook, and transmit the generated HARQ-ACK by using at least one of an uplink control channel (PUCCH: Physical Uplink Control Channel) and an uplink shared channel (PUSCH: Physical Uplink Shared Channel).

When the UE is configured to semi-statically determine the HARQ-ACK codebook (or the semi-static HARQ-ACK codebook), the determination of the HARQ-ACK codebook may be determined to as type 1 HARQ-ACK codebook determination. When the UE is configured to dynamically determine the HARQ-ACK codebook (or the dynamic HARQ-ACK codebook), the determination of the HARQ-ACK codebook may be determined to as type 2 HARQ-ACK codebook determination.

According to type 1 HARQ-ACK codebook determination, the UE may determine the number of HARQ-ACK bits based on a configuration configured by higher layer signaling. The configuration to be configured may include the number (e.g., a maximum number or a minimum number) of DL transmission (e.g., PDSCH) to be scheduled over a range associated with an HARQ-ACK feedback timing.

The range is also referred to as an HARQ-ACK bundling window, an HARQ-ACK feedback window, a bundling window or a feedback window. The bundling window may correspond to a range of at least one of a space, a time and a frequency.

FIG. 1 is a conceptual explanatory diagram of the HARQ-ACK bundling window. In FIG. 1, a bundling window size is 6 (corresponding to 6 slots). Furthermore, above $K_1=\{2, 3, 4, 5, 6, 7\}$ is used (notified to the UE).

The UE transmits HARQ-ACK for all DL data candidates (PDSCH candidates) (i.e., PDSCH candidates that are 2 to 7 slots before a UL slot) in the bundling window on UL at each UL transmission timing (UL slot).

As illustrated in FIG. 1, as the time passes, the bundling window slides. An order of A/N included in the codebook may slide following the slide of the bundling window.

As is clear from this example, duplicated HARQ-ACK is transmitted in a certain slot (PDSCH candidate) in some cases.

When CA is configured, the UE may collectively transmit HARQ-ACK of a plurality of CCs to be subjected to CA in the bundling window at a certain UL transmission timing.

On the other hand, according to type 2 HARQ-ACK codebook determination, the UE may determine the number of HARQ-ACK bits based on a bit sequence of a DL Assignment index (DAI: Downlink Assignment Indicator (Index)) field included in downlink control information (e.g., DL assignment).

(FR1/FR2)

According to NR, it has been studied that the UE performs communication (transmission/reception and measurement of signals) by using at least one frequency band (carrier frequency) of a first frequency band (FR1: Frequency Range 1) and a second frequency band (FR2: Frequency Range 2).

For example, FR1 may be a frequency range (sub-6 GHz) equal to or less than 6 GHz, and FR2 may be a frequency range (above-24 GHz) higher than 24 GHz.

FR1 may be defined as a frequency range that uses at least one of 15, 30 and 60 kHz as a Sub-Carrier Spacing (SCS).

FR2 be defined as a frequency range that uses at least one of 60 and 120 kHz as the SCS. In addition, the frequency ranges and definitions of FR1 and FR2 are not limited to these, and, for example, FR1 may be a higher range higher than FR2.

FR2 may be used only for a Time Division Duplex (TDD) band. FR2 supports a millimeter Wave (mmW) whose wavelength is appropriately 1 mm to 10 mm, and therefore may be referred to as an mmW band. The mmW band may be referred to as an Extremely High Frequency (EHF).

In addition, FR1 and FR2 according to the present disclosure may be respectively read as the first frequency range and the second frequency range that are more general expressions that are not limited to specific frequency ranges.

Figure 2:
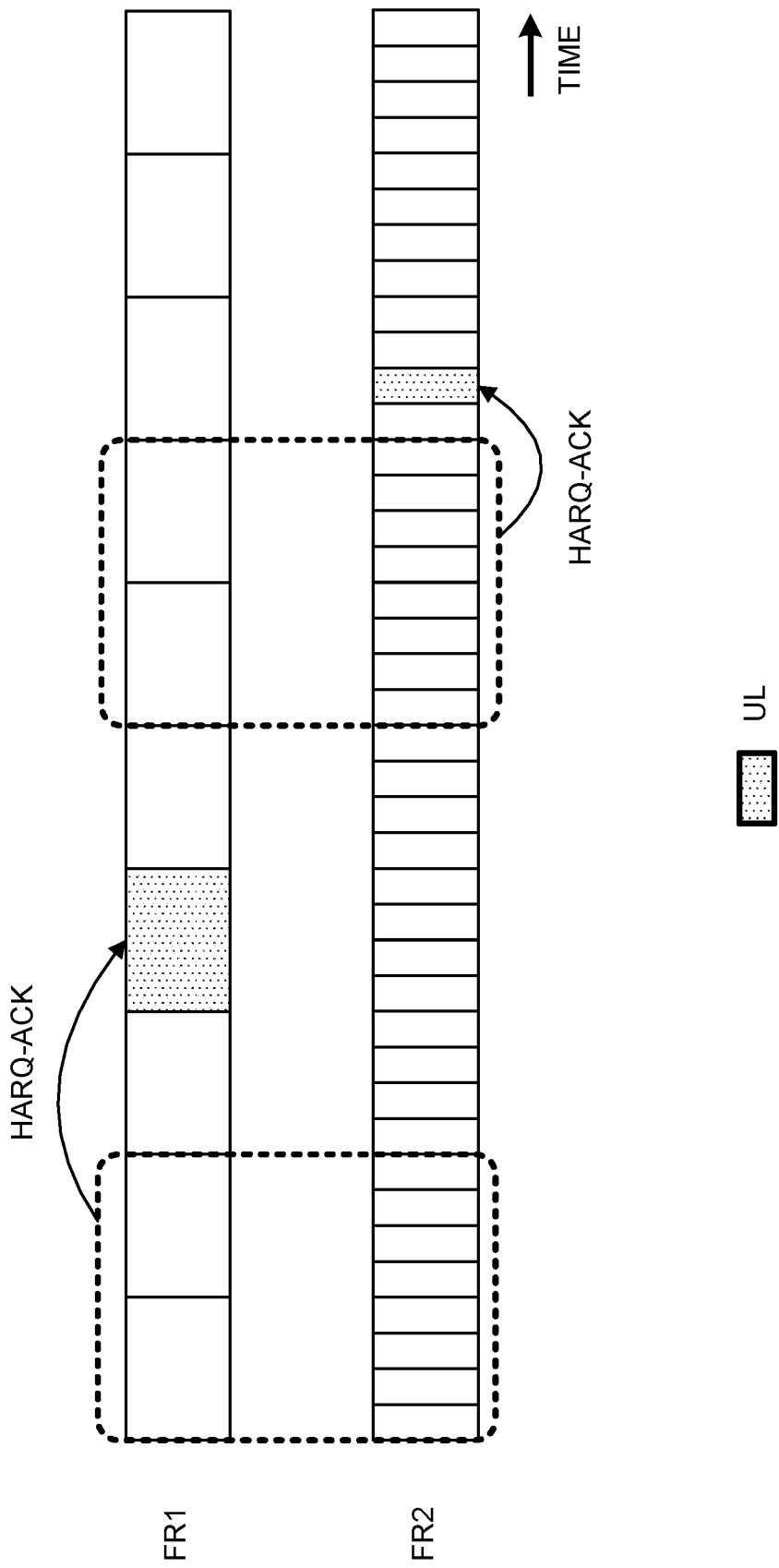
FIG. 2 is a diagram illustrating one example of feedback based on a semi-static HARQ-ACK codebook in a case where mixed numerology CA that uses FR1 and FR2 is configured.

FIG. 2 is a diagram illustrating one example of feedback based on the semi-static HARQ-ACK codebook in a case where mixed numerology CA that uses FR1 and FR2 is configured. In this example, CCs of FR1 and FR2 are configured to the same PUCCH group. Furthermore, it is assumed that the PUCCH is configured to the CC of FR1 (the CC of FR1 is a PUCCH cell).

In addition, for ease of description, this example assumes that the SCS of FR2 is 4 times (e.g., the SCS of FR1=30 kHz and the SCS of FR2=120 kHz) as the SCS of FR1. It is assumed that a slot length of FR2 is one fourth of a slot length of FR1, and the CCs of FR1 and FR2 are synchronized. The numerologies and synchronization environment to which the present disclosure is applied are not limited to these.

When a network (e.g., base station) needs to cause the UE to feed back the HARQ-ACK codebook by using the PUCCH of FR1, the network can realize this feedback by not scheduling the PUSCH at a timing that overlaps the PUCCH. This is because, when the PUCCH and the PUSCH are concurrently transmitted, HARQ-ACK is subjected to piggyback (transmitted) to the PUSCH.

When the network needs to cause the UE to feed back the HARQ-ACK codebook by using the PUSCH of FR1, the network only needs to grant the PUSCH to the CC of FR1.

When the network needs to causes the UE to feed back the HARQ-ACK codebook by using the PUSCH of FR2, the network only needs to grant the PUSCH to the CC of FR2. In this case, PUSCH transmission of the CC of FR1 may not be scheduled at the same timing as that of PUSCH transmission of FR2.

When transmitting the HARQ-ACK codebook in FR1, the UE may generate HARQ-ACK of FR2 in the bundling window, and transmit the HARQ-ACK by using the CC of FR1. When transmitting the HARQ-ACK codebook in FR2, the UE may generate HARQ-ACK of FR1 in the bundling window, and transmit the HARQ-ACK by using the CC of FR2.

In a case of this example, the HARQ-ACK corresponding to 2 slots of FR1 and the HARQ-ACK corresponding to corresponding 8 slots of FR2 may be transmitted in at least one of UL slots of FR1 and FR2. In a case of the semi-static codebook, the UE can appropriately grasp the number of HARQ-ACK bits to be generated for each CC.

When receiving HARQ-ACK related to a plurality of CCs in a slot of a certain CC, the base station can individually extract HARQ-ACK of each CC. For example, the base station may extract HARQ-ACK related to FR1 from the HARQ-ACK received in FR1, and drop the HARQ-ACK related to FR2. Furthermore, the base station may extract the HARQ-ACK related to FR2 from the HARQ-ACK received in FR2, and drop HARQ-ACK related to FR1.

Naturally, the base station may extract and use HARQ-ACK of another CC from HARQ-ACK received in a slot of a certain CC.

When HARQ-ACK related to a plurality of CCs is transmitted by using the PUSCH of each CC as described above, PUCCHs may not be configured to these CCs (it may be assumed that at least HARQ-ACK is not transmitted by using the PUCCH in these CCs).

Currently, according to NR, it has been studied that the UE is not expected to transmit HARQ-ACK configured to take a shorter time than the processing time. More specifically, it has been studied that, when the network configures, to the UE, values of $K_1$ and/or $K_2$ for which a sufficient processing time is not left, the UE does not expect to transmit HARQ-ACK to be multiplexed with UL data (UE is not expected transmit the HARQ-ACK multiplexed with uplink data if the network set the values of K1 and/or K2 without leaving sufficient time for UE processing).

However, this study has some unclear points. When, for example, CA of a CC of a different SCS is configured, and HARQ-ACK codebook feedback is performed in a CC of a larger SCS, a problem is assumed to occur.

A processing time of HARQ-ACK codebook feedback in a case of mixed CA of FR1 and FR2 will be more specifically described below. As described above, the processing time is specified based on a numerology associated with the minimum SCS among the PDCCH/PDSCH and the PUCCH/PUSCH.

Figure 3:
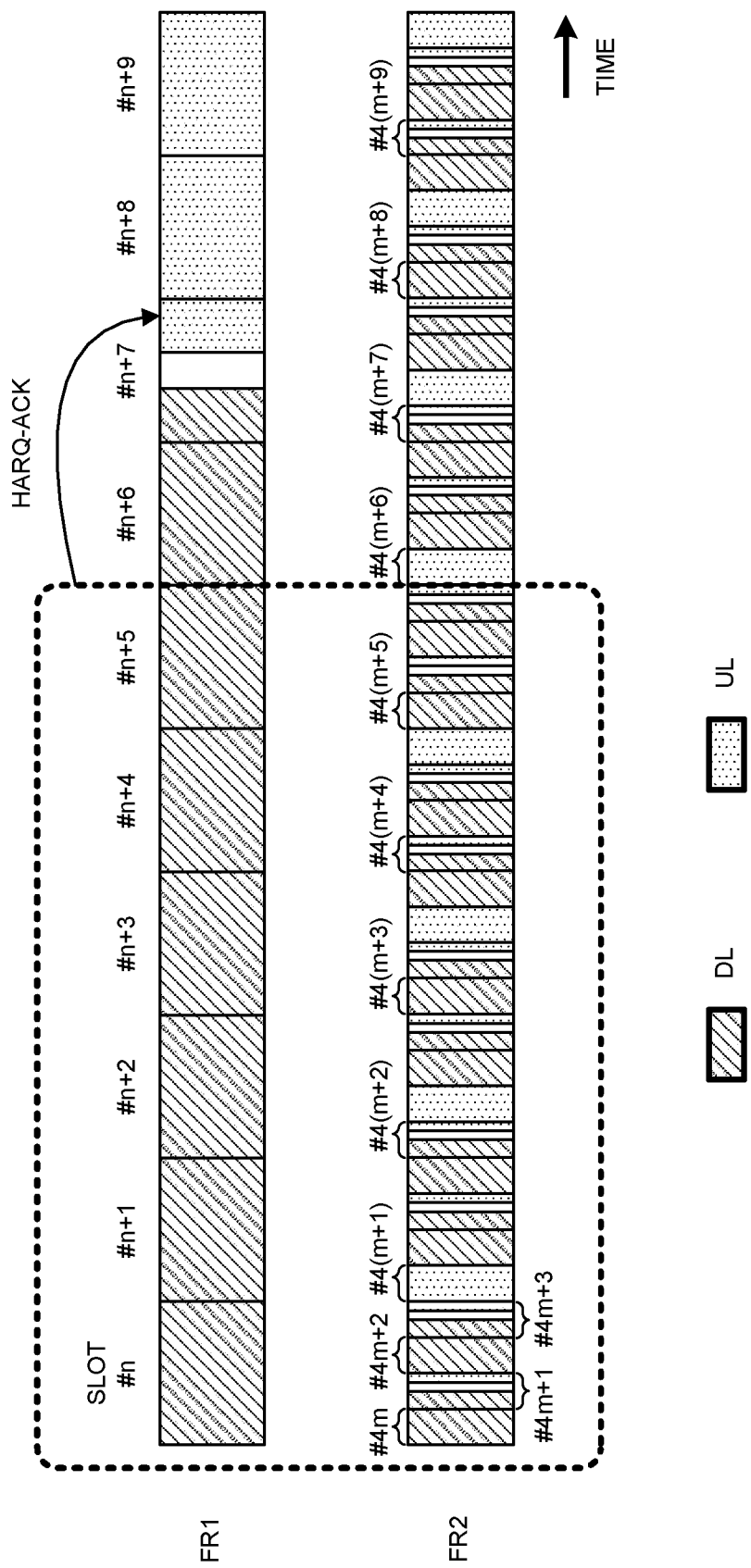
FIG. 3 is a diagram illustrating one example where the semi-static HARQ-ACK codebook is fed back on a PUCCH/PUSCH of FR1 by mixed numerology CA.

FIG. 3 is a diagram illustrating one example where the semi-static HARQ-ACK codebook is fed back on the PUCCH/PUSCH of FR1 by mixed numerology CA. In this example, the CC of FR1 and the CC of FR2 are configured to the same PUCCH group. Furthermore, it is assumed that the PUCCH is configured to the CC of FR1 (the CC of FR1 is the PUCCH cell). In addition, "transmitting the semi-static HARQ-ACK codebook" (transmission based on the codebook) may be interchangeably read as "transmitting the semi-static HARQ-ACK".

Furthermore, the same condition (the SCS of FR2 is four times as the SCS of FR1) as that in FIG. 2 is assumed. The same applies to diagrams related to HARQ-ACK feedback subsequent to FIG. 3.

In FR1 in FIG. 3, slots #n to #n+6 include only DL symbols, a slot #n+7 includes DL symbols and UL symbols, and slots #n+8 and #n+9 include only UL symbols. FR2 is illustrated as a range from a slot #4m to #4 (m+9)+3, and DL/UL is as illustrated in FIG. 3.

It is assumed that $K_1=\{2, 3, 4, 5, 6, 7\}$ is used for the above various parameters, and $K_{2,1}$ that is $K_2$ of FR1 is $K_{2,1}=\{2, 3, 4\}$.

When semi-static HARQ-ACK is transmitted on the PUCCH in the slot #n+7, the semi-static HARQ may be multiplexed with HARQ-ACK for the PDSCH corresponding to 6 slots of slots #n to #n+5. Furthermore, when semi-static HARQ-ACK is transmitted on the PUCCH in the slot #n+7, the semi-static HARQ-ACK may be multiplexed with HARQ-ACK for the PDSCH corresponding to 24 slots of the slot #4m to #4(m+5)+3 of FR2.

Furthermore, when it is assumed that semi-static HARQ-ACK is transmitted on the PUCCH in the slot #n+7 of FR1, and when a UL grant for the PUSCH of FR1 indicating $K_{2,1}=2$ is received in the slot #n+5 (or slots #4(m+5) to #4(m+5)+3 of FR2) of FR1, the UE may transmit the semi-static HARQ-ACK on the PUSCH in the slot #n+7 of FR1. The semi-static HARQ-ACK codebook to be transmitted may include HARQ-ACK for the above-described 6 slots of FR1 and 24 slots of FR2.

In a case where $K_1$ and/or $K_{2,1}$ are configured so as to perform transmission at a timing at which a PDSCH processing time of FR1 can be supported, it can be naturally said that HARQ-ACK to be transmitted on the PUCCH/PUSCH of FR1 is configured to take a longer time than the processing time.

In addition, HARQ-ACK that exceeds the maximum number of HARQ processes may not be transmitted or may be neither transmitted nor used. When, for example, there are 20 slots including DL slots and DL symbols of FR2 in the bundling window in FIG. 3, if the maximum number of HARQ processes is 16, it may be assumed that four HARQs cannot be used.

Figure 4:
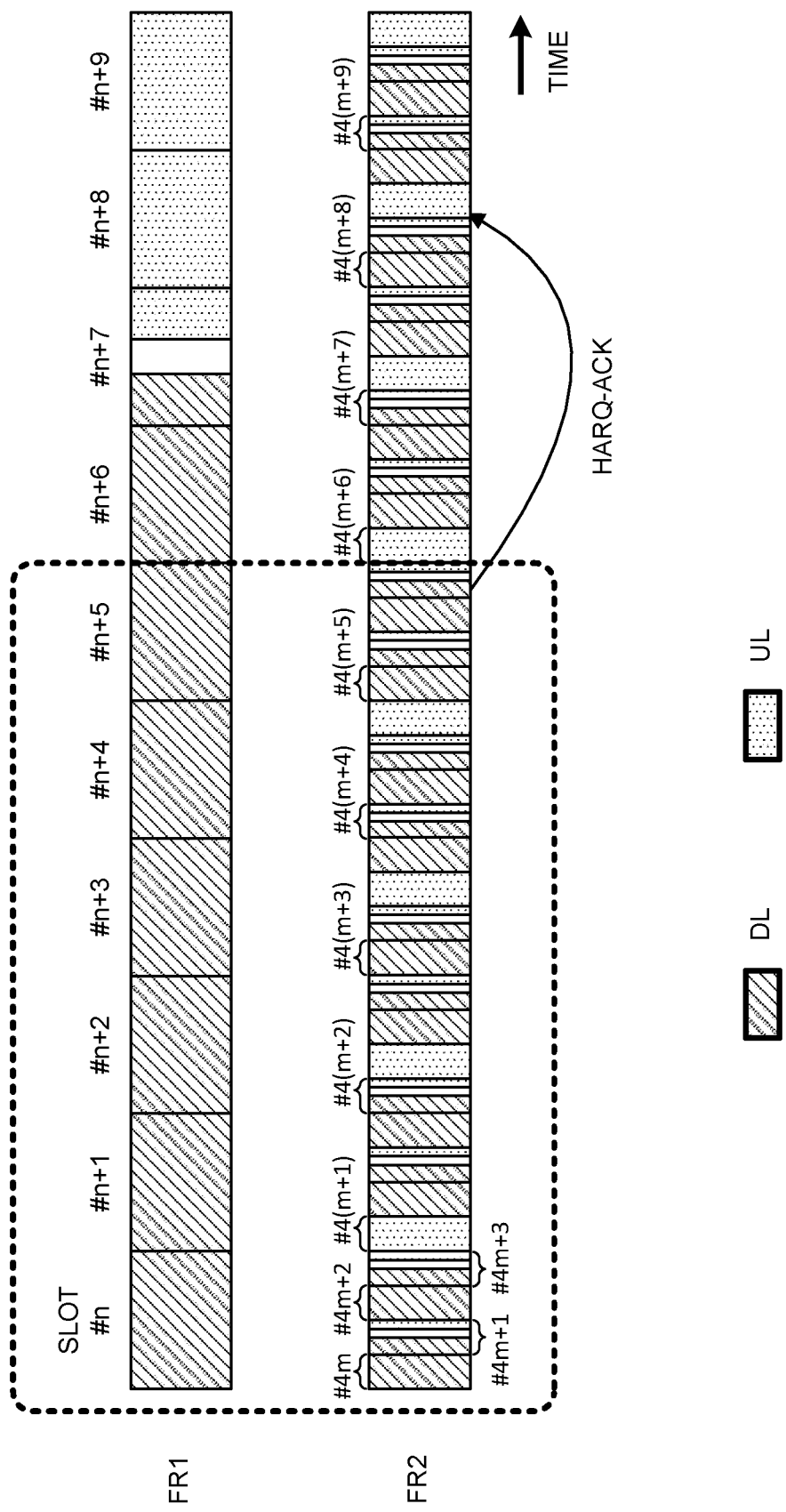
FIG. 4 is a diagram illustrating one example where the semi-static HARQ-ACK codebook is fed back on a PUSCH of FR2 by mixed numerology CA.

FIG. 4 is a diagram illustrating one example where the semi-static HARQ-ACK codebook is fed back on the PUSCH of FR2 by mixed numerology CA. This example assumes a case where a lager value than a given value (e.g., 8, 16 or 32) is configured as $K_{2,2}$ that is $K_2$ of FR2. In this case, even when the semi-static HARQ-ACK is transmitted on the PUSCH of FR2, it is possible to reserve the processing time of the PDSCH of FR1.

In an example in FIG. 4, the UE may receive the UL grant for the PUSCH of FR2 indicating $K_{2,2}=11$ in the slot #4(m+5)+3 of FR2, and transmit semi-static HARQ-ACK on the PUSCH in a slot #4(m+8)+2 of FR2.

When $K_1$ and/or $K_{2,1}$ are configured to perform transmission at a timing at which the PDSCH processing time of FR1 can be supported, it can be naturally said that HARQ-ACK to be transmitted on the PUSCH of FR2 is configured to take a longer time than the processing time.

Figure 5:
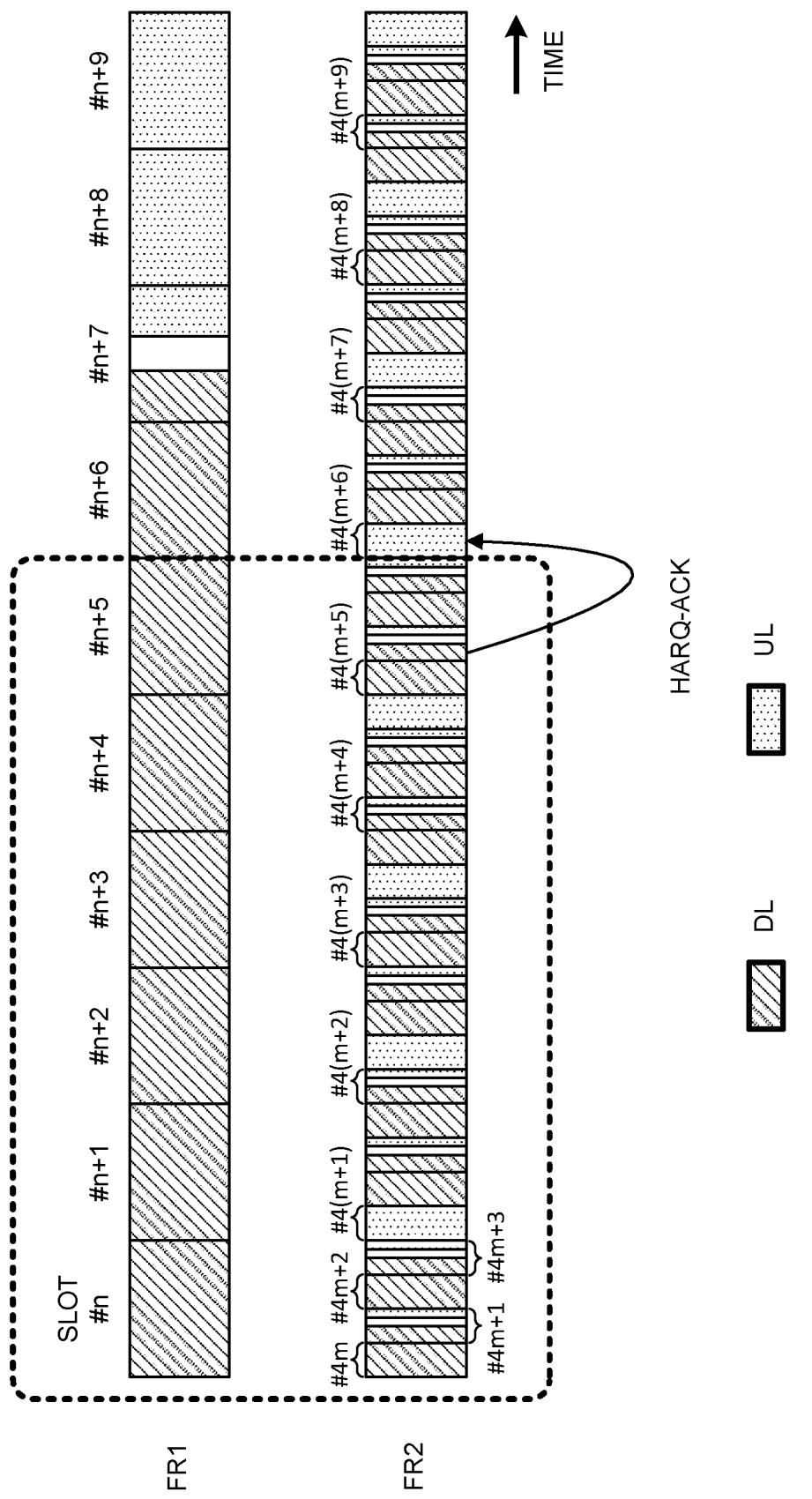
FIG. 5 is a diagram illustrating another example where the semi-static HARQ-ACK codebook is fed back on the PUSCH of FR2 by mixed numerology CA.

FIG. 5 is a diagram illustrating another example where the semi-static HARQ-ACK codebook is fed back on the PUSCH of FR2 by mixed numerology CA. This example assumes a case where a value smaller than a given value (e.g., 8) is configured as $K_{2,2}$ that is $K_2$ of FR2. $K_{2,2}$ is assumed to be $K_{2,2}=\{3, 4, 6, 7\}$.

In an example in FIG. 5, the UE may receive the UL grant for the PUSCH of FR2 indicating $K_{2,2}=31$ in a slot #4(m+5)+1 of FR2, and transmit semi-static HARQ-ACK on the PUSCH in a slot #4(m+6) of FR2.

In the example illustrated in FIG. 5, $K_1$ and/or $K_{2,2}$ are not configured to perform transmission at a timing at which the PDSCH processing time of FR1 can be supported.

According to the study that has been done so far, how semi-static HARQ-ACK to be transmitted on the PUSCH needs to be configured in a case where there is HARQ-ACK whose processing does not make it in time for transmission of the PUSCH is not clear. Unless this point is not clarified, there is a risk that HARQ-ACK transmission cannot be appropriately performed, and a communication throughput and frequency use efficiency deteriorate.

Hence, the inventors of this application have conceived a configuration and a relevant operation for appropriately transmitting HARQ-ACK even when mixed numerology CA is configured and the semi-static HARQ-ACK codebook is configured by this CA.

Embodiments according to the present disclosure will be described in detail below with reference to the drawings. A radio communication method according to each embodiment may be each applied alone or may be applied in combination.

The present disclosure will be described assuming mixed numerology CA that uses the CC of FR1 and the CC of FR2.

FR1 and FR2 may be any frequency ranges. For example, FR1 may be read as a CC that uses the first SCS. FR2 may be read as a CC that uses a larger second SCS than the above first SCS.

In addition, the following embodiments will be described assuming mixed numerology CA. However, even in a case where CA of CCs of the same numerology is configured, contents of the present disclosure may be applied. Mixed numerology CA may be read simply as CA or DC.

(Radio Communication Method)

First Embodiment

According to the first embodiment, when mixed numerology CA is configured to the UE, all of a value of $K_1$ configured to a PUCCH cell to be subjected to CA, and a value of $K_2$ configured to each UL cell to be subjected to CA may be configured not to violate a processing time (e.g., a PDSCH processing time, a PUCCH processing time or a sum of these processing times) (satisfy a processing time restriction (request)) based on at least one of $N_1$ and $N_2$.

In other words, according to the first embodiment, when a base station configures mixed numerology CA to the UE, all of the value of $K_1$ configured to the PUCCH cell to be subjected to CA, and the value of $K_2$ configured to each UL cell to be subjected to CA may be configured not to violate the processing time based on at least one of $N_1$ and $N_2$. This configuration may depend on an implementation of a gNB.

The UE may assume that all of the value of $K_1$ and the value of $K_2$ configured to each UL cell to be subjected to CA may be configured not to violate the processing time (e.g., the PDSCH processing time, the PUCCH processing time or the sum of these processing times) (satisfy a processing time restriction (request)) based on at least one of $N_1$ and $N_2$, and assume that all values are not configured to violate the processing time.

The UE may be report at least one value of $N_1$ and $N_2$ (or information that is related to (can be specified as) this value) as terminal capability information to the base station. In this case, by taking the reported terminal capability information into account, the base station configures all of the value of $K_1$ configured to the PUCCH cell to be subjected to CA, and the value of $K_2$ configured to each UL cell to be subjected to CA not to violate the processing time (e.g., the PDSCH processing time, the PUCCH processing time or the sum of these processing times) (satisfy the processing time restriction (request)) based on at least one of $N_1$ and $N_2$.

According to the above-described first embodiment, as illustrated in above FIG. 4, a value larger than at least one of the PDSCH processing time, the PUSCH processing time and the sum of these processing times can be configured as $K_2$ of FR2 to the UE. Furthermore, even when semi-static HARQ-ACK is transmitted on a PUSCH of one of CCs, it is possible to satisfy each requirement of processing time.

Second Embodiment

According to the second embodiment, when mixed numerology CA is configured to a UE, at least part of a value of $K_1$ configured to a PUCCH cell to be subjected to CA, and a value of $K_2$ configured to each UL cell to be subjected to CA may be configured to violate the processing time based on at least one of $N_1$ and $N_2$.

According to the second embodiment, as for HARQ-ACK codebook determination for mixed numerology CA (that may be referred to as HARQ-ACK related set determination), HARQ-ACK corresponding to values of $K_1$ and/or $K_2$ that do not satisfy a UE requirement of processing time may be deleted. That is, the UE may transmit (does not need to feed back) semi-static HARQ-ACK without including HARQ-ACK corresponding to the values of $K_1$ and/or $K_2$ that do not satisfy a UE requirement of processing time in the semi-static HARQ-ACK.

That is, when there is not a sufficient processing time left for a candidate PDSCH (a PDSCH that can be included in a bundling window) and HARQ-ACK transmission for the candidate PDSCH, at least part of HARQ-ACK to be multiplexed with UL data may not be transmitted. In other words, when a network configures (instructs) values of $K_1$ and/or $K_2$ that do not leave a sufficient time between the candidate PDSCH and HARQ-ACK codebook transmission to the UE, the UE may not feed back HARQ-ACK corresponding to the candidate PDSCH in a corresponding HARQ-ACK codebook.

The UE may transmit information that can specify deleted HARQ-ACK (e.g., can specify an HARQ-ACK bit position or corresponding $K_1$) to the base station. In addition, the UE may delete the HARQ-ACK bit that does not satisfy the requirement of processing time, and pad zero.

According to the above-described second embodiment, even when there is HARQ-ACK whose processing does not make it in time for transmission of the PUSCH as in above FIG. 5, it is possible to transmit semi-static HARQ-ACK without including the HARQ-ACK in the semi-static HARQ-ACK.

Third Embodiment

Similar to the second embodiment, according to the third embodiment, when mixed numerology CA is configured to a UE, at least part of a value of $K_1$ configured to a PUCCH cell to be subjected to CA, and a value of $K_2$ configured to each UL cell to be subjected to CA may be configured to violate the processing time based on at least one of $N_1$ and $N_2$.

According to the third embodiment, as for HARQ-ACK related set determination for mixed numerology CA, a UE requirement of processing time may be not be taken into account. That is, the UE may generate (transmit) HARQ-ACK corresponding to values of $K_1$ and/or $K_2$ that do not satisfy a UE requirement of processing time as a fixed value (ACK or NACK).

That is, when there is not a sufficient processing time left for a candidate PDSCH and HARQ-ACK transmission for the candidate PDSCH, at least part of HARQ-ACK to be multiplexed with UL data may not be transmitted as the fixed value. In other words, when a network configures (instructs) values of $K_1$ and/or $K_2$ that do not leave a sufficient time between the candidate PDSCH and HARQ-ACK codebook transmission to the UE, the UE may use HARQ-ACK corresponding to the candidate PDSCH as a fixed value in a corresponding HARQ-ACK codebook.

In this regard, ACK or NACK to be transmitted for the candidate PDSCH does not have to do with whether or not the candidate PDSCH is successfully decoded (i.e., ACK or NACK may be fixedly determined). ACK or NACK to be transmitted for the candidate PDSCH may be used as a virtual CRS bit for HARQ-ACK detection. The virtual CRC bit is a known bit value included in a payload to be transmitted, and may be referred to as, for example, a pruning bit. Generally, as a known bit value increases, it is possible to improve an error correction effect.

According to the above-described third embodiment, even when there is HARQ-ACK whose processing does not make it in time for transmission of a PUSCH as in above FIG. 5, it is possible to transmit semi-static HARQ-ACK by using the HARQ-ACK as the fixed value.

<Other>

Generation of HARQ-ACK, transmission of the HARQ-ACK, determination of the HARQ-ACK and specification of the HARQ-ACK according to the present disclosure may be interchangeably read. Furthermore, the HARQ-ACK according to the present disclosure may be expressed as ACK, NACK or A/N. Furthermore, HARQ-ACK bits and the HARQ-ACK according to the present disclosure may be interchangeably read.

A base station may perform reception processing (such as decoding) on the HARQ-ACK assuming a UE operation according to each of the above-described embodiments.

(Radio Communication System)

The configuration of the radio communication system according to one embodiment of the present disclosure will be described below. This radio communication system uses one or a combination of the radio communication method according to each of the above embodiments of the present disclosure to perform communication.

Figure 6:
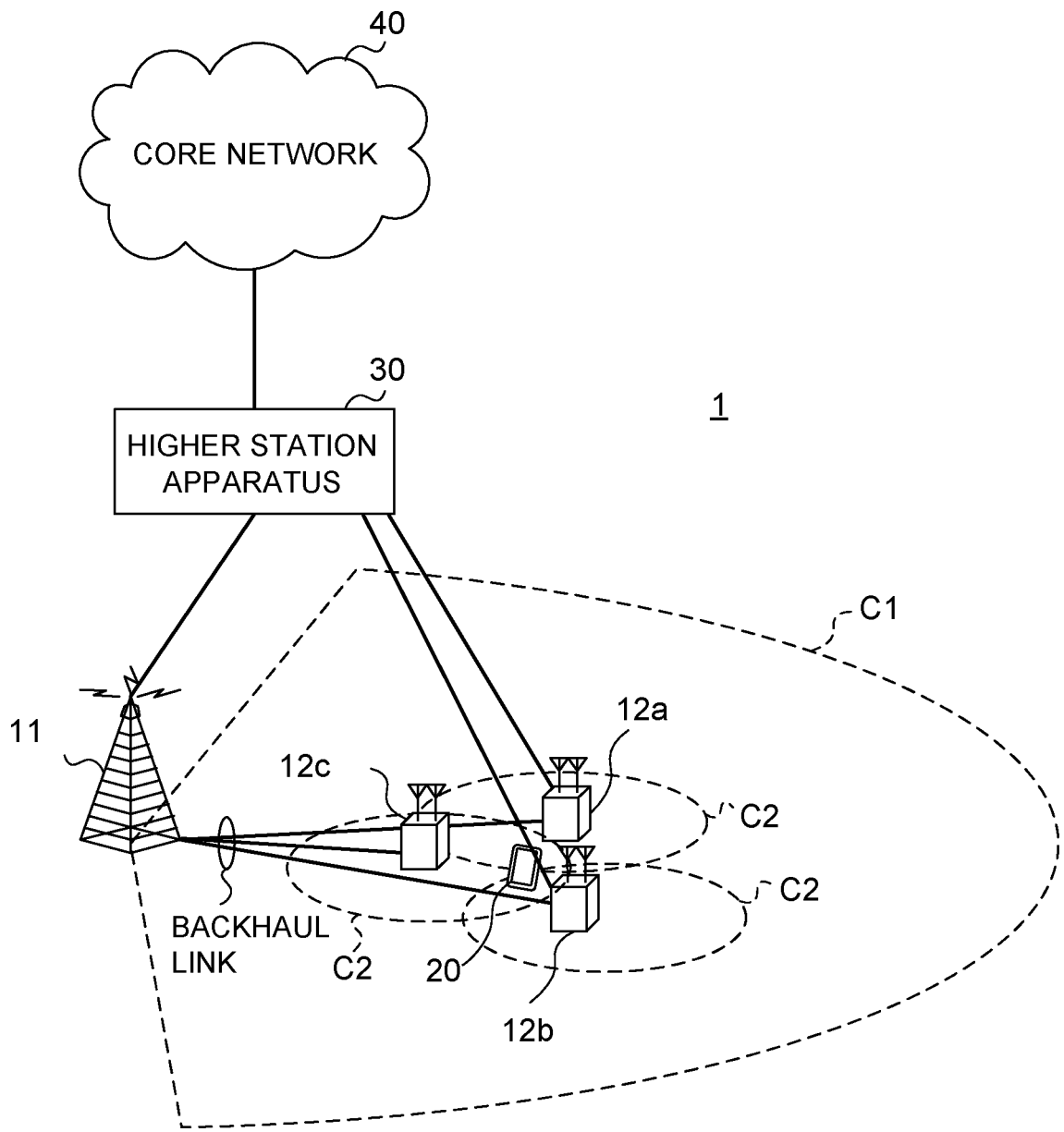
FIG. 6 is a diagram illustrating one example of a schematic configuration of a radio communication system according to one embodiment.

FIG. 6 is a diagram illustrating one example of a schematic configuration of the radio communication system according to the one embodiment. A radio communication system 1 can apply at least one of Carrier Aggregation (CA) and Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or may be referred to as a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and user terminals 20 are not limited to the aspect illustrated in FIG. 6.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using at least one of Time Division Duplex (TDD) and Frequency Division Duplex (FDD) in each cell.

Furthermore, each cell (carrier) may be applied a single numerology or may be applied a plurality of different numerologies.

The numerology may be a communication parameter to be applied to at least one of transmission and reception of a certain signal or channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain.

For example, a case where at least one of sub-carrier spacings of constituent OFDM symbols and the number of OFDM symbols are different on a certain physical channel may be referred to as that numerologies are different.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and at least one of Single Carrier Frequency Division Multiple Access (SC-FDMA) and OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink control channel as downlink channels. User data, higher layer control information and System Information Blocks (SIBs) are transmitted on the PDSCH. Furthermore, Master Information Blocks (MIBs) are transmitted on the PBCH.

The downlink control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of at least one of the PDSCH and the PUSCH is transmitted on the PDCCH.

In addition, DCI for scheduling DL data reception may be referred to as a DL assignment, and DCI for scheduling UL data transmission may be referred to as a UL grant.

The number of OFDM symbols used for the PDCCH may be transmitted on the PCFICH. Transmission acknowledgement information (also referred to as, for example, retransmission control information, HARQ-ACK or ACK/NACK) of a Hybrid Automatic Repeat reQuest (HARD) for the PUSCH may be transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with a cell is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be transmitted is not limited to these.

(Radio Base Station)

Figure 7:
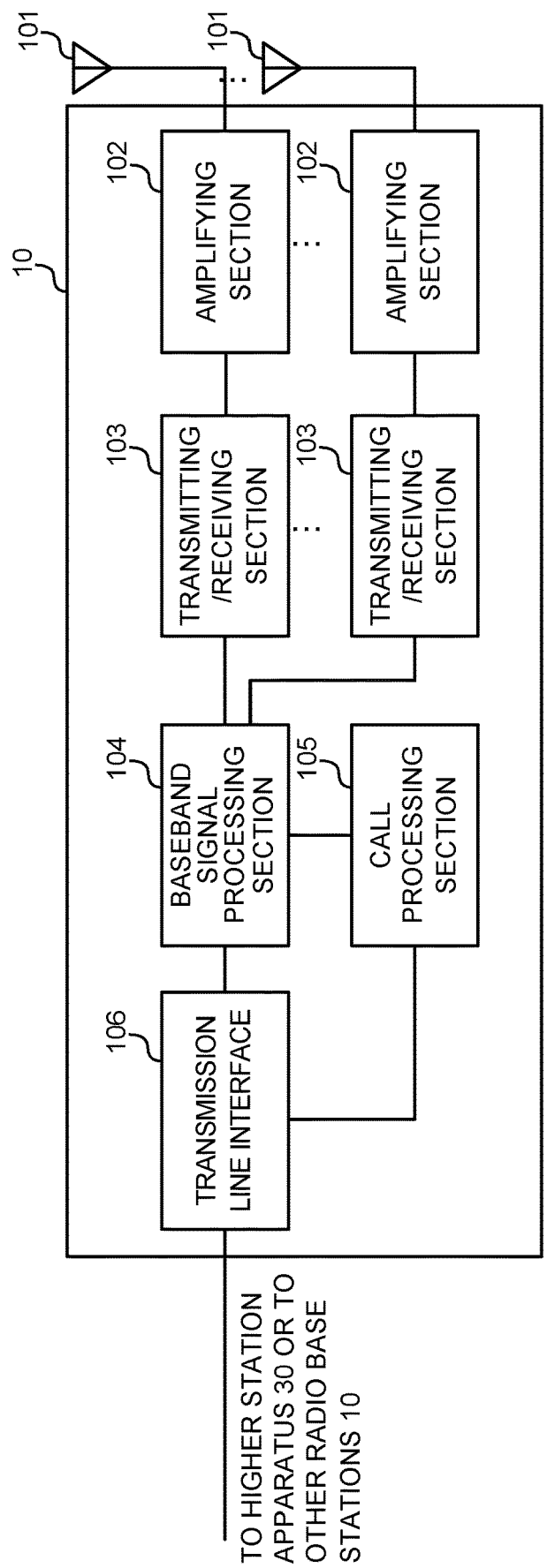
FIG. 7 is a diagram illustrating one example of an overall configuration of a radio base station according to the one embodiment.

FIG. 7 is a diagram illustrating one example of an overall configuration of the radio base station according to the one embodiment. The radio base station 10 includes pluralities of transmission/reception antennas 101, amplifying sections 102 and transmitting/receiving sections 103, a baseband signal processing section 104, a call processing section 105 and a transmission line interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the transmission line interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency band, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present disclosure. In this regard, the transmitting/receiving sections 103 may be composed as an integrated transmitting/receiving section or may be composed of transmission sections and reception sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the transmission line interface 106. The call processing section 105 performs call processing (such as configuration and release) of a communication channel, state management of the radio base station 10, and radio resource management.

The transmission line interface 106 transmits and receives signals to and from the higher station apparatus 30 via a given interface. Furthermore, the transmission line interface 106 may transmit and receive (backhaul signaling) signals to and from the another radio base station 10 via an inter-base station interface (e.g., optical fibers compliant with the Common Public Radio Interface (CPRI) or the X2 interface).

Figure 8:
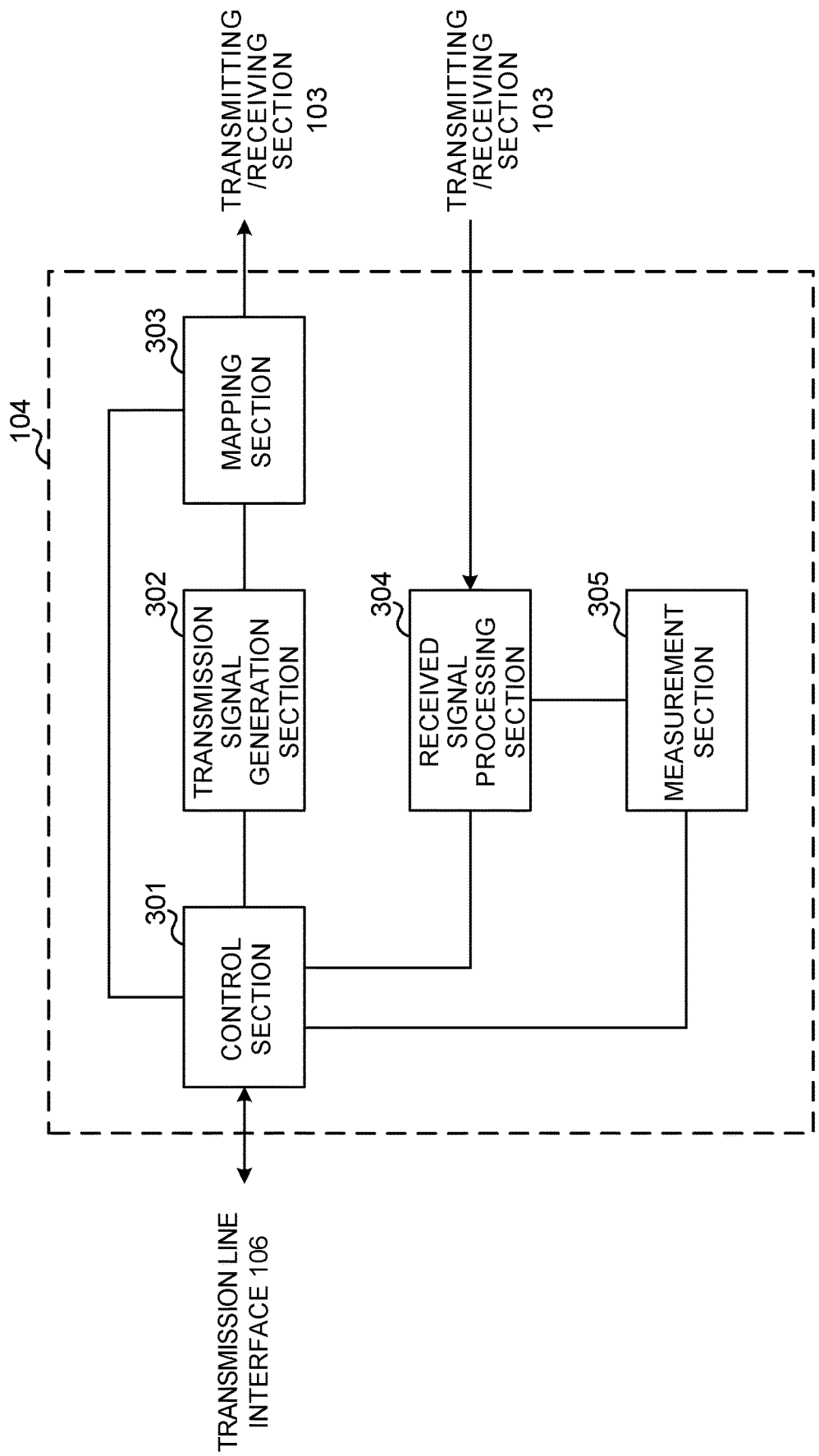
FIG. 8 is a diagram illustrating one example of a function configuration of the radio base station according to the one embodiment.

FIG. 8 is a diagram illustrating one example of a function configuration of the radio base station according to the one embodiment of the present disclosure. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted by using a downlink shared channel), and a downlink control signal (e.g., a signal transmitted by using a downlink control channel). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted by using an uplink shared channel), an uplink control signal (e.g., a signal transmitted by using an uplink control channel), a random access preamble and an uplink reference signal.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates at least one of, for example, a DL assignment for notifying downlink data allocation information, and a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a given radio resource based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs at least one of the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) and a Signal to Noise Ratio (SNR)), a signal strength (e.g., Received Signal Strength Indicator (RSSI)) or channel information (e.g., CSI). The measurement section 305 may output a measurement result to the control section 301.

In addition, each transmitting/receiving section 103 may communicate with the user terminal 20 by using at least one of a first Component Carrier (CC) that uses a first Sub-Carrier Spacing (SCS) and a second CC that uses a second SCS larger than the first SCS.

The control section 301 transmits a semi-static HARQ-ACK codebook related to both of the first CC and the second CC on an uplink shared channel of the second CC, the control section 301 may configure to the user terminal 20 a timing (a PDSCH-to-ACK timing that may be referred to as "$K_1$") from reception of a downlink shared channel to transmission of HARQ-ACK and a timing (a ULgrant-to-PUSCH timing that may be referred to as "$K_2$") from reception of downlink control information for scheduling the uplink shared channel to transmission of the uplink shared channel such that HARQ-ACK bits corresponding to all items of data satisfy a requirement of processing time.

The control section 301 may perform control to perform HARQ-ACK reception processing (decoding) on the HARQ-ACK bits received from the user terminal 20 assuming a UE operation according to at least one of the aforementioned embodiments.

(User Terminal)

Figure 9:
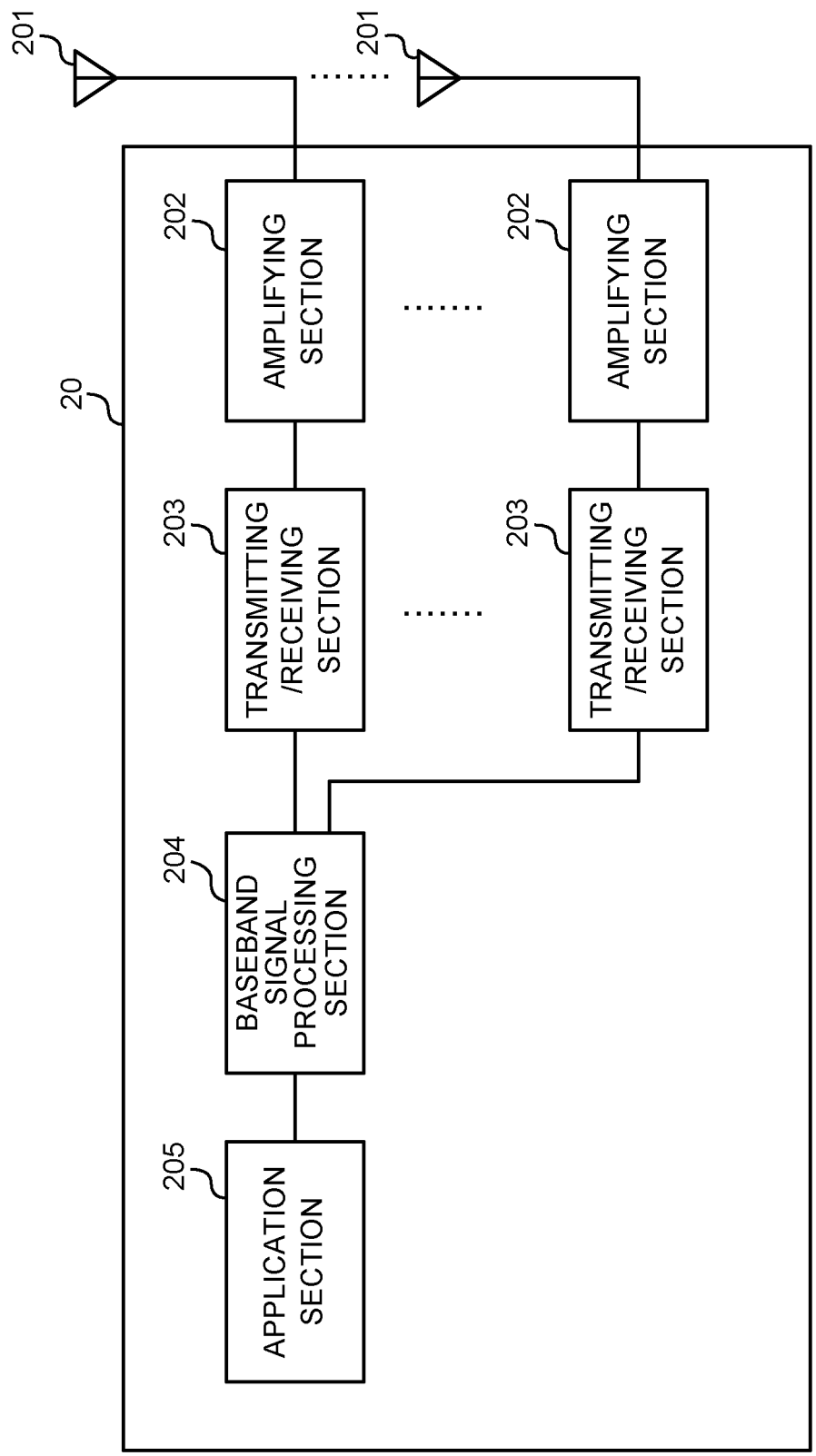
FIG. 9 is a diagram illustrating one example of an overall configuration of a user terminal according to the one embodiment.

FIG. 9 is a diagram illustrating one example of an overall configuration of the user terminal according to the one embodiment. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201.

Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present disclosure. In this regard, the transmitting/receiving sections 203 may be composed as an integrated transmitting/receiving section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency band, and transmits a radio frequency signal. The radio frequency signal subjected to the frequency conversion by each transmitting/receiving section 203 is amplified by each amplifying section 202, and is transmitted from each transmission/reception antenna 201.

Figure 10:
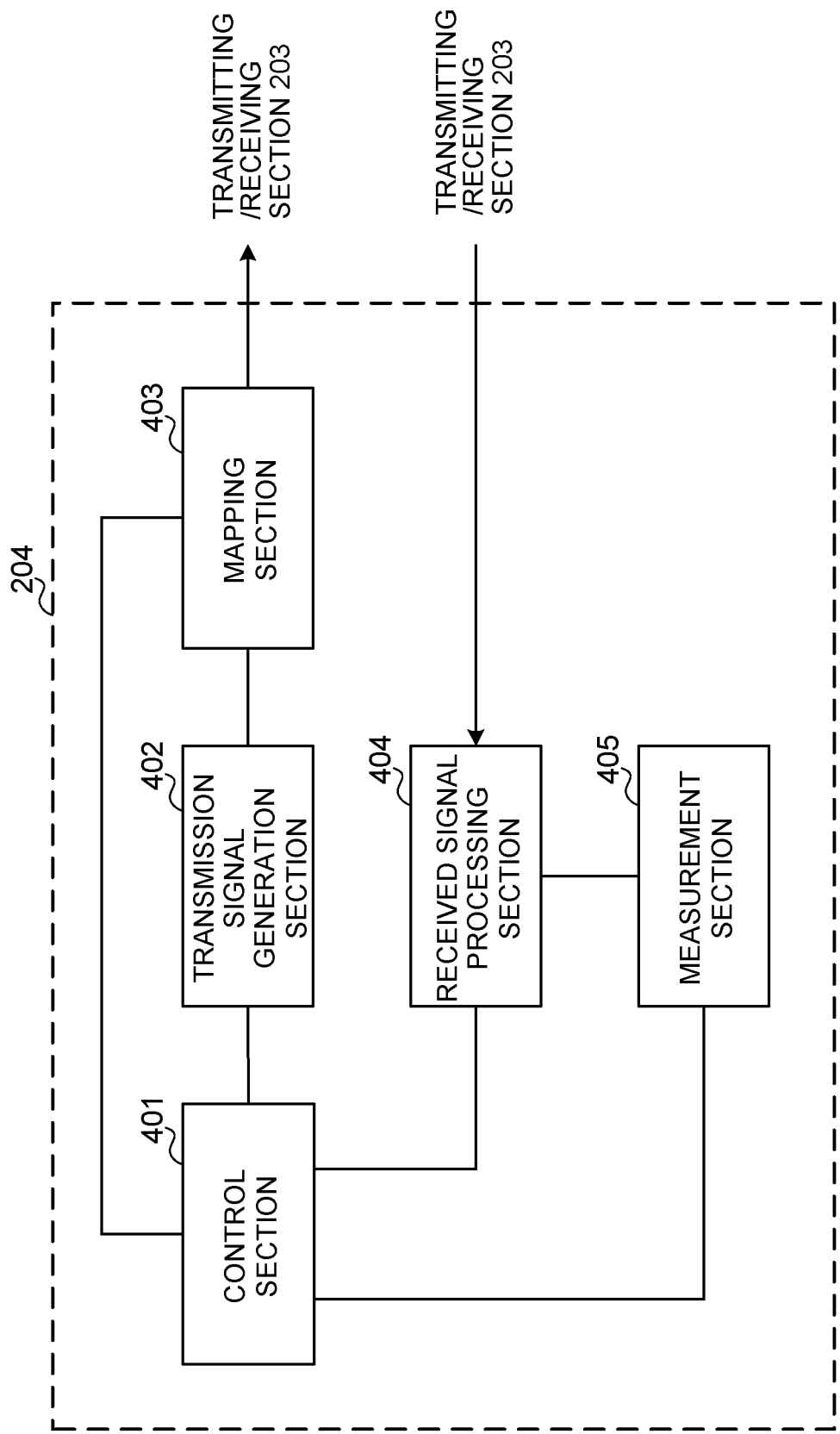
FIG. 10 is a diagram illustrating one example of a function configuration of the user terminal according to the one embodiment.

FIG. 10 is a diagram illustrating one example of a function configuration of the user terminal according to the one embodiment. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and an uplink data signal based on the downlink control signal as a result of deciding whether or not it is necessary to perform retransmission control on the downlink data signal.

Furthermore, when obtaining from the received signal processing section 404 various pieces of information notified from the radio base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the reception section according to the present disclosure.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs at least one of the received signal and the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

In addition, each transmitting/receiving section 203 may perform transmission and reception by using the first Component Carrier (CC) that uses the first Sub-Carrier Spacing (SCS) and the second CC that uses the second SCS larger than the first SCS.

Furthermore, when a semi-static HARQ-ACK codebook related to one or both of the first CC and the second CC is transmitted on the uplink shared channel (PUSCH) of the second CC, the control section 401 may delete on the HARQ-ACK bits corresponding to data (that may be PDSCH candidates) that does not satisfy the processing request, or perform zero padding.

Furthermore, when the semi-static HARQ-ACK codebook related to one or both of the first CC and the second CC is transmitted on the uplink shared channel (PUSCH) of the second CC, the control section 401 may determine (and generate) the HARQ-ACK bits corresponding to data (that may be the PDSCH candidates) that does not satisfy the requirement of processing time as one of ACK and NACK.

(Hardware Configuration)

In addition, the block diagrams used to describe the above embodiments illustrate blocks in function units. These function blocks (components) are realized by an optional combination of at least one of hardware and software. Furthermore, a method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection).

Figure 11:
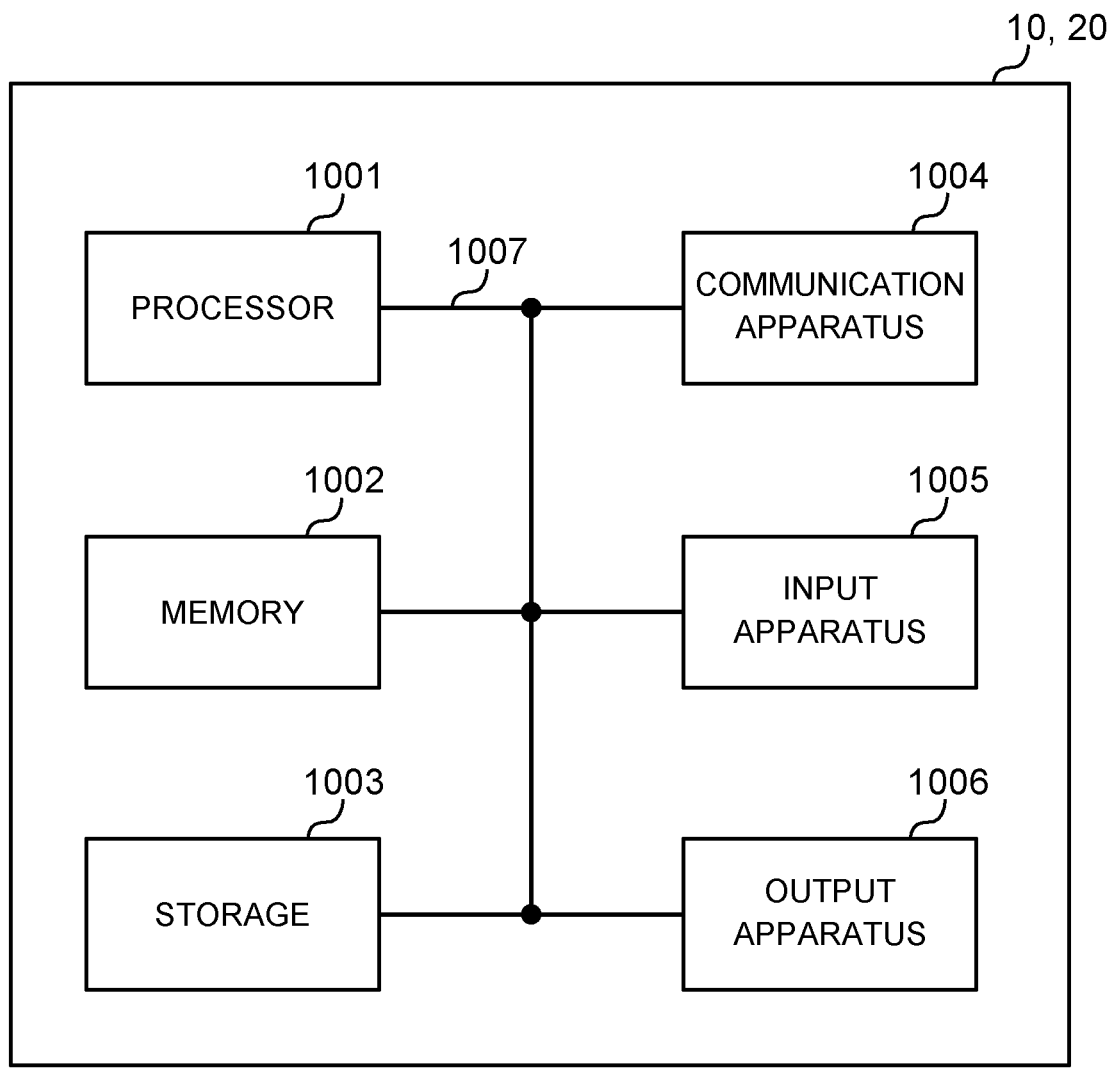
FIG. 11 is a diagram illustrating one example of hardware configurations of the radio base station and the user terminal according to the one embodiment.

For example, the radio base station and the user terminal according to the one embodiment of the present disclosure may function as computers that perform processing of the radio communication method according to the present disclosure. FIG. 11 is a diagram illustrating one example of the hardware configurations of the radio base station and the user terminal according to the one embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates the only one processor 1001. However, there may be a plurality of processors. Furthermore, processing may be executed by one processor or processing may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control at least one of communication via the communication apparatus 1004 and reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize, for example, at least one of Frequency Division Duplex (FDD) and Time Division Duplex (TDD). For example, the above transmission/reception antennas 101 (201), amplifying sections 102 (202), transmitting/receiving sections 103 (203) and transmission line interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in the present disclosure and each term that is necessary to understand the present disclosure may be replaced with terms having identical or similar meanings. For example, at least one of a channel and a symbol may be a signal (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies.

Furthermore, the slot may include a plurality of mini slots. Each mini slot may include one or a plurality of symbols in the time domain. Furthermore, the mini slot may be referred to as a subslot. The mini slot may include a smaller number of symbols than those of the slot. The PDSCH and the PUSCH to be transmitted in larger time units than that of the mini slot may be referred to as a PDSCH/PUSCH mapping type A. The PDSCH and the PUSCH to be transmitted by using the mini slot may be referred to as a PDSCH/PUSCH mapping type B.

The radio frame, the subframe, the slot, the mini slot and the symbol each indicate a time unit for transmitting signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and codeword, or may be a processing unit of scheduling or link adaptation. In addition, when the TTI is given, a time interval (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspect/embodiments described in the present disclosure and may be performed by using other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed as 1 bit, may be made based on a boolean expressed as true or false or may be made by comparing numerical values (e.g., comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least one of wired techniques (e.g., coaxial cables, optical fiber cables, twisted pairs and Digital Subscriber Lines (DSL)) and radio techniques (e.g., infrared rays and microwaves), at least one of these wired techniques and radio technique is included in a definition of the transmission media.

The terms "system" and "network" used in the present disclosure can be compatibly used.

In the present disclosure, the terms "Base Station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier" and "Bandwidth Part (BWP)" can be compatibly used. The base station is also referred to as a term such as a macro cell, a small cell, a femto cell or a pico cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of at least one of the base station and the base station subsystem that provides communication service in this coverage.

In the present disclosure, the terms "Mobile Station (MS)", "user terminal", "User Equipment (UE)" and "terminal" can be compatibly used.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus or a reception apparatus. In this regard, at least one of the base station and the mobile station may be a device mounted on a movable body or the movable body itself. The movable body may be a vehicle (e.g., a car or an airplane), a movable body that moves unmanned (e.g., a drone or a self-driving car) or a robot (a manned type or an unmanned type). In addition, at least one of the base station and the mobile station includes an apparatus, too, that does not necessarily move during a communication operation.

Furthermore, the radio base station in the present disclosure may be read as the user terminal. For example, each aspect/embodiment of the present disclosure may be applied to a configuration where communication between the radio base station and the user terminal is replaced with communication between a plurality of user terminals (that may be referred to as Device-to-Device (D2D) or Vehicle-to-Everything (V2X)). In this case, the user terminal 20 may be configured to include the functions of the above radio base station 10. Furthermore, words such as "uplink" and "downlink" may be read as a word (e.g., a "side") corresponding to device-to-device communication. For example, the uplink channel may be read as a side channel.

Similarly, the user terminal in the present disclosure may be read as the radio base station. In this case, the radio base station 10 may be configured to include the functions of the above user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements in an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods or next-generation systems that are expanded based on these systems. Furthermore, a plurality of systems may be combined (e.g., a combination of LTE or LTE-A or 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be regarded to "decide (determine)" judging, calculating, computing, processing, deriving, investigating, looking up (e.g., looking up in a table, a database or another data structure) and ascertaining.

Furthermore, "deciding (determining)" may be regarded to "decide (determine)" receiving (e.g., receiving information), transmitting (e.g., transmitting information), input, output and accessing (e.g., accessing data in a memory).

Furthermore, "deciding (determining)" may be regarded to "decide (determine)" resolving, selecting, choosing, establishing and comparing. That is, "deciding (determining)" may be regarded to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when connected in the present disclosure, the two elements are "connected" or "coupled" with each other by using one or more electric wires, cables or printed electrical connection, and by using electromagnetic energy having wavelengths in radio frequency domains, microwave domains or (both of visible and invisible) light domains in some non-restrictive and incomprehensive examples.

A sentence that "A and B are different" in the present disclosure may mean that "A and B are different from each other". Words such as "separate" and "coupled" may be also interpreted in a similar manner.

When the words "include" and "including" and modifications of these words are used in the present disclosure or the claims, these words intend to be comprehensive similar to the word "comprising". Furthermore, the word "or" used in the present disclosure or the claims intends not to be an exclusive OR.

When, for example, translation adds articles such as a, an and the in English in the present disclosure, the present disclosure may include that nouns following these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined by the recitation of the claims. Accordingly, the disclosure of the present disclosure intends for exemplary explanation, and does not have any restrictive meaning to the invention according to the present disclosure.

The invention claimed is:

1. A terminal comprising:
   a transceiver that transmits and receives using a first cell that uses a first Sub-Carrier Spacing (SCS), and a second cell that uses a second SCS larger than the first SCS; and
   a processor that, when a semi-static Hybrid Automatic Repeat reQuest Acknowledgement (HARQ-ACK) codebook related to both of the first cell and the second cell is transmitted on an uplink shared channel of the second cell, controls transmission of the semi-static HARQ-ACK codebook where all HARQ-ACK bits included in the semi-static HARQ-ACK codebook satisfy a requirement of processing time on a basis of a notified timing from reception of a downlink shared channel to transmission of HARQ-ACK and a notified timing from reception of downlink control information for scheduling the uplink shared channel to transmission of the uplink shared channel.

2. A radio communication method for a terminal comprising:
   transmitting and receiving using a first cell that uses a first Sub-Carrier Spacing (SCS), and a second cell that uses a second SCS larger than the first SCS; and
   when a semi-static Hybrid Automatic Repeat reQuest Acknowledgement (HARQ-ACK) codebook related to both of the first cell and the second cell is transmitted on an uplink shared channel of the second cell, controlling transmission of the semi-static HARQ-ACK codebook where all HARQ-ACK bits included in the semi-static HARQ-ACK codebook satisfy a requirement of processing time on a basis of a notified timing from reception of a downlink shared channel to transmission of HARQ-ACK and a notified timing from reception of downlink control information for scheduling the uplink shared channel to transmission of the uplink shared channel.

3. A base station comprising:
a transceiver that transmits to or receives from a terminal using at least one of a first cell that uses a first Sub-Carrier Spacing (SCS), and a second cell that uses a second SCS larger than the first SCS; and
a processor that, when the terminal transmits a semi-static Hybrid Automatic Repeat reQuest Acknowledgement (HARQ-ACK) codebook related to both of the first cell and the second cell on an uplink shared channel of the second cell, notifies to the terminal a timing from reception of a downlink shared channel to transmission of HARQ-ACK and a timing from reception of downlink control information for scheduling the uplink shared channel to transmission of the uplink shared channel such that to satisfy a requirement of processing time for all HARQ-ACK bits included in the semi-static HARQ-ACK codebook.

4. A system comprising a base station and a terminal, wherein:
the base station comprises:
  a transceiver that transmits to or receives from the terminal using at least one of a first cell that uses a first Sub-Carrier Spacing (SCS), and a second cell that uses a second SCS larger than the first SCS; and
  a processor that, when the terminal transmits a semi-static Hybrid Automatic Repeat reQuest Acknowledgement (HARQ-ACK) codebook related to both of the first cell and the second cell on an uplink shared channel of the second cell, notifies to the terminal a timing from reception of a downlink shared channel to transmission of HARQ-ACK and a timing from reception of downlink control information for scheduling the uplink shared channel to transmission of the uplink shared channel to satisfy a requirement of processing time for all HARQ-ACK bits included in the semi-static HARQ-ACK codebook; and
the terminal comprises:
  a transceiver that transmits and receives using the first cell and the second cell; and
  a processor that, when the semi-static HARQ-ACK codebook is transmitted on the uplink shared channel, controls transmission of the semi-static HARQ-ACK codebook where the all HARQ-ACK bits included in the semi-static HARQ-ACK codebook satisfy the requirement of the processing time on a basis of the notified timing from reception of the downlink shared channel to transmission of HARQ-ACK and the notified timing from the reception of the downlink control information for scheduling the uplink shared channel to transmission of the uplink shared channel.

* * * * *